(12) United States Patent
Chesnokov

(10) Patent No.: US 11,307,746 B2
(45) Date of Patent: Apr. 19, 2022

(54) IMAGE MANIPULATION

(71) Applicant: Apical Ltd, Cambridge (GB)

(72) Inventor: Viacheslav Chesnokov, Loughborough (GB)

(73) Assignee: Apical Ltd, Cambridge (GB)

( * ) Notice: Subject to any disclaimer, the term of this patent is extended or adjusted under 35 U.S.C. 154(b) by 496 days.

(21) Appl. No.: 15/717,134

(22) Filed: Sep. 27, 2017

(65) Prior Publication Data

US 2018/0095647 A1 Apr. 5, 2018

(30) Foreign Application Priority Data

Sep. 30, 2016 (GB) ...................................... 1616720

(51) Int. Cl.
*G06F 3/0484* (2013.01)
*G06F 3/0488* (2013.01)
*G06T 5/00* (2006.01)
*G06F 3/04845* (2022.01)
*G06F 3/04883* (2022.01)

(52) U.S. Cl.
CPC ...... *G06F 3/04845* (2013.01); *G06F 3/04883* (2013.01); *G06T 5/009* (2013.01); *G06F 2203/04806* (2013.01); *G06F 2203/04808* (2013.01); *G06T 2200/24* (2013.01)

(58) Field of Classification Search
CPC ....... G06F 3/04883; G06F 2203/04806; G06F 2203/04808
USPC ......................................................... 715/863
See application file for complete search history.

(56) References Cited

U.S. PATENT DOCUMENTS

| | | | | |
|---|---|---|---|---|
| 8,259,208 | B2 * | 9/2012 | Ciurea | H04N 5/232939 348/333.02 |
| 9,286,706 | B1 * | 3/2016 | Krishnaswamy | G06T 11/60 |
| 9,299,168 | B2 * | 3/2016 | Ubillos | G06T 11/001 |
| 2007/0098297 | A1 * | 5/2007 | Fushiki | G06T 11/60 382/276 |
| 2008/0052945 | A1 * | 3/2008 | Matas | G06F 3/0485 34/173 |
| 2008/0122796 | A1 * | 5/2008 | Jobs | G06F 3/0488 345/173 |

(Continued)

OTHER PUBLICATIONS

"Overview of JPEG XT"; <https://jpeg.org/jpegxt/>; published Dec. 15, 2015 (Year: 2015).*

(Continued)

*Primary Examiner* — Stephen S Hong
*Assistant Examiner* — Broderick C Anderson
(74) *Attorney, Agent, or Firm* — EIP US LLP

(57) ABSTRACT

A method includes displaying an image on a first area of a touch-sensitive electronic display and receiving touch input on a second area of the display, comprising the first area. A gesture type is detected from the touch input by detecting a larger component of motion of the touch input along one of first and second axes of the display than along the other of the axes. Detecting a second gesture type comprises detecting a larger component of motion of the touch input along the other of the axes than along the one of the axes. If the gesture type is the first gesture type, a display characteristic of the image is adjusted, during displaying the image. If the gesture type is the second gesture type, the display ceases to display the image and displays a further image. A computing system is provided.

20 Claims, 5 Drawing Sheets

(56) References Cited

U.S. PATENT DOCUMENTS

| | | | |
|---|---|---|---|
| 2010/0293500 A1* | 11/2010 | Cragun | G06F 3/04883 715/784 |
| 2011/0093822 A1* | 4/2011 | Sherwani | H04L 67/38 715/863 |
| 2011/0163971 A1 | 7/2011 | Wagner et al. | |
| 2011/0239155 A1 | 9/2011 | Christie | |
| 2013/0238724 A1 | 9/2013 | Cunningham | |
| 2013/0346913 A1* | 12/2013 | Smith | G06F 3/017 715/784 |
| 2015/0089452 A1* | 3/2015 | Dorninger | G06F 3/0488 715/848 |
| 2016/0062571 A1 | 3/2016 | Dascola et al. | |
| 2017/0185268 A1* | 6/2017 | Zeng | G06F 3/04845 |

OTHER PUBLICATIONS

Durand F., Dorsey J. (2000) Interactive Tone Mapping. In: Péroche B., Rushmeier H. (eds) Rendering Techniques 2000. EGSR 2000. Eurographics. Springer, Vienna, https://doi.org/10.1007/978-3-7091-6303-0_20 (Year: 2000).*

Search Report dated Mar. 24, 2017 on related United Kingdom Application GB 1616720.7 filed Sep. 30, 2016.

* cited by examiner

```
┌─────────────────────────────────────────────────────────────┐
│ Displaying an image on a first area of a touch-sensitive    │
│ electronic display, the touch-sensitive electronic display  │
│ comprising a first axis and a second axis which is          │
│ orthogonal to the first axis                                │
└─────────────────────────────────────────────────────────────┘
                              ↓
┌─────────────────────────────────────────────────────────────┐
│ Receiving touch input on a second area of the touch-        │
│ sensitive electronic display, the second area comprising    │
│ the first area                                              │
└─────────────────────────────────────────────────────────────┘
                              ↓
┌─────────────────────────────────────────────────────────────┐
│ Detecting, from the touch input, a gesture type which is    │
│ one of a plurality of detectable gesture types, wherein     │
│ the plurality of detectable gesture types comprise a first  │
│ gesture type and a second gesture type, wherein detecting   │
│ the first gesture type comprises detecting a larger         │
│ component of motion of the touch input along one of the     │
│ first and second axes of the touch-sensitive electronic     │
│ display than along the other of the first and second axes   │
│ of the touch-sensitive electronic display and detecting     │
│ the second gesture type comprises detecting a larger        │
│ component of motion of the touch input along the other of   │
│ the first and second axes of the touch-sensitive electronic │
│ display than along the one of the first and second axes of  │
│ the touch-sensitive electronic display                      │
└─────────────────────────────────────────────────────────────┘
                              ↓
┌─────────────────────────────────────────────────────────────┐
│ If the detected gesture type is the first gesture type,     │
│ adjusting, during the displaying the image, a display       │
│ characteristic of the image in dependence on at least one   │
│ detected characteristic of the motion of the touch input    │
└─────────────────────────────────────────────────────────────┘
                              ↓
┌─────────────────────────────────────────────────────────────┐
│ If the detected gesture type is the second gesture type:    │
│ ceasing to display the image on the touch-sensitive         │
│ electronic display; and displaying a further image on the   │
│ touch-sensitive electronic display                          │
└─────────────────────────────────────────────────────────────┘
```

*FIG. 1*

IMAGE MANIPULATION

CROSS-REFERENCE TO RELATED APPLICATIONS

This application claims priority under 35 U.S.C. § 119(a) and 37 CFR § 1.55 to United Kingdom Application No. GB 1616720.7, filed Sep. 30, 2016. The entire contents of the above-referenced patent application are hereby incorporated by reference.

BACKGROUND

Field of the Disclosure

The present disclosure relates to a method and a computing system for manipulating an image.

DESCRIPTION OF THE RELATED TECHNOLOGY

A software application is known that allows a captured image to be processed after capture. For example, the image can be modified as desired by a user and a modified version of the image can be saved for future use. It is desirable to provide a method of manipulating an image that is intuitive and more flexible than the method of the known software application.

SUMMARY

A first aspect provides a method including displaying an image on a first area of a touch-sensitive electronic display, the touch-sensitive electronic display including a first axis and a second axis which is orthogonal to the first axis. The method includes receiving touch input on a second area of the touch-sensitive electronic display, the second area including the first area. The method includes detecting, from the touch input, a gesture type which is one of a plurality of detectable gesture types. The plurality of detectable gesture types includes a first gesture type and a second gesture type. Detecting the first gesture type includes detecting a larger component of motion of the touch input along one of the first and second axes of the touch-sensitive electronic display than along the other of the first and second axes of the touch-sensitive electronic display and detecting the second gesture type includes detecting a larger component of motion of the touch input along the other of the first and second axes of the touch-sensitive electronic display than along the one of the first and second axes of the touch-sensitive electronic display. If the detected gesture type is the first gesture type, the method includes adjusting, during the displaying the image, a display characteristic of the image in dependence on at least one detected characteristic of the motion of the touch input, and displaying a further image on the touch-sensitive electronic display.

A second aspect provides a computing system including a computing device and a touch-sensitive electronic display coupled to the computing device. The touch-sensitive electronic display includes a first axis, a second axis which is orthogonal to the first axis, a first area and a second area. The second area includes the first area. The computing device includes storage, at least one processor communicatively coupled to the storage, an image displaying module configured to display the image on the first area of the touch-sensitive electronic display, and a gesture type detection module configured to detect, from a touch input on the second area of the touch-sensitive electronic display, a gesture type which is one of a plurality of detectable gesture types, the plurality of detectable gesture types including a first gesture type and a second gesture type. Detecting the first gesture type includes detecting a larger component of motion of the touch input along one of the first and second axes of the touch-sensitive electronic display than along the other of the first and second axes of the touch-sensitive electronic display. Detecting the second gesture type includes detecting a larger component of motion of the touch input along the other of the first and second axes of the touch-sensitive electronic display than along the one of the first and second axes of the touch-sensitive electronic display. The computing device further includes a display characteristic adjustment module configured to, if the detected gesture type is the first gesture type, adjust, during displaying the image on the first area of the electronic display, a display characteristic of the image in dependence on at least one detected characteristic of the motion of the touch input. The computing device further including an image switching module configured to, if the detected gesture type is the second gesture type, cease displaying the image on the touch-sensitive electronic display and display a further image on the touch-sensitive electronic display.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein:

FIG. 1 is a flow diagram illustrating a method according to examples;

DETAILED DESCRIPTION

Figure 2A:
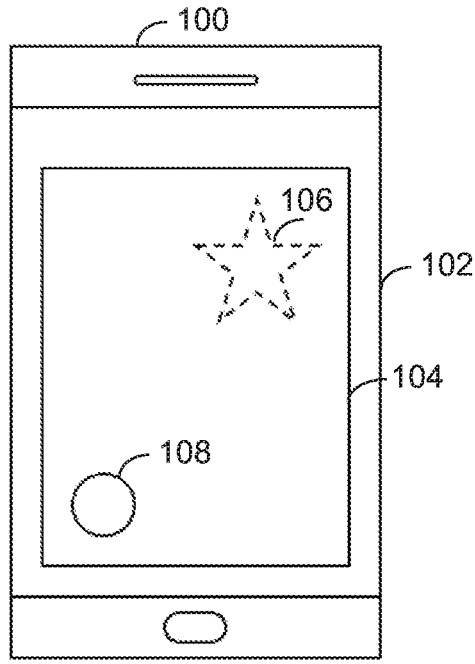
FIGS. 2a and 2b illustrate schematically an example of a first gesture type.

Details of the method according to examples will become apparent from the following description, with reference to the FIGS. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples. For example, in certain cases, a description of conventional features is simplified or omitted in order to provide a concise explanation of the method according to examples.

Examples described herein provide a method of manipulating an image, which may for example be implemented using a computing device or computing system. The image may be the entire or whole image or a portion, part or subset of a larger image. The image is for example an image from a web page accessed by a browser of the computing device, such as a browser of a smartphone; an image captured by an image capture device, such as a camera, of the computing device; or an image downloaded to or stored in storage of the computing device. The image may include any graphical or visual content, for example text, graphics, pictures, and/or photographs. The image may be represented by image data in any suitable format. Common formats include the JPEG (Joint Photographic Experts Group, ISO/IEC 10918) format, which is typically an 8-bit format, or the JPEG XT (ISO/IEC 18477) format, which is typically a more than 8-bit format.

FIG. 1 is a flow diagram illustrating the method according to examples. The method of FIG. 1 includes displaying an image on a first area of a touch-sensitive electronic display. The touch-sensitive electronic display is for example a display device of or coupled to a computing device, which is capable of receiving input via a user's touch on the display itself. For example, the touch-sensitive electronic display may be the screen of a smartphone. The touch-sensitive electronic display has a first axis and a second axis which is orthogonal to the first axis.

The method of FIG. 1 further includes receiving touch input on a second area of the touch-sensitive electronic display. The second area includes the first area. The touch input is for example a touch of a body part of a user, such as one or more fingers or a hand, or a touch of an implement such as a stylus.

In the example of FIG. 1, the method includes detecting, from the touch input, a gesture type. A gesture type for example corresponds with a predetermined movement, motion, location or position of the touch input. The gesture type is one of a plurality of detectable gesture types including a first gesture type and a second gesture type. Detecting the first gesture type includes detecting a larger component of motion of the touch input along one of the first and second axes of the touch-sensitive electronic display than along the other of the first and second axes of the touch-sensitive electronic display. Detecting the second gesture type includes detecting a larger component of motion of the touch input along the other of the first and second axes of the touch-sensitive electronic display than along the one of the first and second axes of the touch-sensitive electronic display.

If the detected gesture type is the first gesture type, the method of FIG. 1 includes adjusting, during the displaying the image, a display characteristic of the image in dependence on at least one detected characteristic of the motion of the touch input. If the detected gesture type is the second gesture type, the method of FIG. 1 includes ceasing to display the image on the touch-sensitive electronic display; and displaying a further image on the touch-sensitive electronic display.

Example methods such as the method of FIG. 1 therefore allow the display characteristic of the image to be changed using a touch input corresponding to the first gesture type, which is for example different from the second gesture type. These methods therefore provide the user with a straightforward and intuitive way to both alter a display characteristic of the image and to switch between displaying different images on the touch-sensitive electronic display. For example, the user can interact with the touch-sensitive electronic display using a touch input corresponding to the first gesture type to alter the display characteristic of the image and can use a touch input corresponding to the second gesture type to move the image off screen and display a different image instead. The user therefore has multiple options for manipulating the image, for example by altering properties of the image itself or by ceasing to display the image and displaying a further image.

The display characteristic of the image can be changed while the image is displayed, without for example saving a modified copy of the image. In this way, by using the first gesture type, the user can flexibly alter the display characteristic of the image in real time, for example without having to save and re-load the image. This can allow the image to be manipulated more straightforwardly than known methods that involve saving a copy of a modified image. The method according to examples can therefore improve a viewing experience for a user, as the user can adjust the display characteristic of the image at will. For example, a user can adjust the display characteristic as needed if the user moves from a high brightness location, e.g. outside, in sunlight, to a low brightness location, e.g. in a dark room. The method also allows different users to adjust the image differently depending on their own preferences. For example, a first user may adjust the display characteristic to a particular level that he or she considers to represent an optimal or desired level, and then a second user of the same computing device may further adjust the display characteristic to a level that suits him or her, merely by using a touch input corresponding to the first gesture type.

Figure 2B:
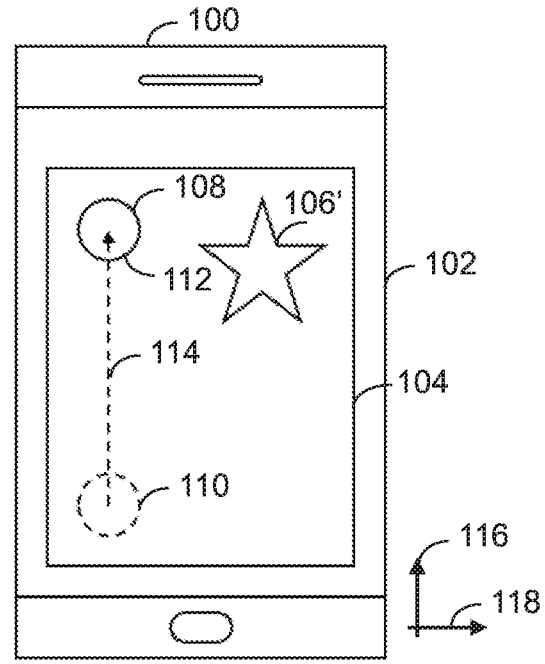

FIGS. 2a and 2b illustrate schematically an example of the first gesture type. FIGS. 2a and 2b each show a computing device 100, which in this example is a smartphone. Internal components of an example computing device such as the computing device 100 of FIGS. 2a and 2b are described in further detail with reference to FIG. 8 below.

The smartphone 100 has a touch-sensitive electronic display 102. The touch-sensitive electronic display 102 has a first area 104. An image is displayed on the first area 104. In the example of FIGS. 2a and 2b, the image includes an image of a star 106. The first area 104 may correspond with an extent of an image being displayed by the touch-sensitive electronic display; for example, a boundary or border of the first area 104 may correspond with the boundary or border of the image as displayed. FIGS. 2a and 2b show such an example; in FIGS. 2a and 2b, the outer edge or extremity of the image is aligned with the edge of the first area 104, such that the image completely fills the first area 104. Alternatively, the first area 104 may be larger or smaller than the image.

The touch-sensitive electronic display 102 in examples such as that of FIGS. 2a and 2b also includes a second area, on which touch input can be received. For example, the second area may correspond with an area of the touch-sensitive electronic display that is responsive to a touch input, such as an area of the touch-sensitive electronic display in which a touchscreen is present.

In examples such as that of FIGS. 2a and 2b, the second area is coincident with the first area 104. For example, the second area may be the same as the first area. In other examples, however, the first area may be smaller than the second area, for example where the extent of the first area corresponds with the extent of the image and where the second area is an entire or whole touch-sensitive area of the smartphone display screen, which includes the first area. For example, the part of the second area not overlapped by the first area may correspond with or include a border area, which may partly or fully surround the first area. Such a border area may be a plain border area, for example including a plain or neutral color such as black or grey, or the border area may contain other images or icons such as icons to interact with the computing device, e.g. a home icon to go back to a home screen, or a back icon to revert to a previously used application.

FIG. 2a shows a touch input 108 on the second area of the touch-sensitive electronic display 102 (which in this example corresponds with the first area 104). The touch input 108 in this example corresponds with pressure applied to the touch-sensitive electronic display 102 in the circled region labelled 108, which is for example applied by a finger of a user.

FIG. 2b shows movement of the touch input 108 from a first location 110 on the second area to a second location 112 on the second area along a path 114. In the example of FIG. 2b, the path 114 is substantially vertical (for example within 5 or 10 degrees of the vertical), although in other examples the path, first and/or second locations may be different from those of FIG. 2b. The touch-sensitive electronic display 102 of FIG. 2b has a first axis 116 and a second axis 118, which are shown in the Figure to the side of the touch-sensitive electronic display 102, for clarity. In examples such as FIG. 2b, the first axis 116 is substantially vertical, e.g. vertical, and the second axis 118 is substantially horizontal, e.g. horizontal, although in other examples, axes of the touch-sensitive electronic display may be at different orientations. Typically, however, the first axis 116 is orthogonal to the second axis 118.

From the touch input 108, a gesture type is detected. In FIG. 2b, the gesture type is a first gesture type, with motion of the touch input 106 along the first axis 116. In examples such as FIG. 2b, a touch input 108 is considered or detected to be a first gesture type if a larger component of motion of the touch input is along the first axis 116 than along the second axis 118. For example, the touch input may be angled with respect to the first axis 116, with a first component of motion along the first axis 116 and a second component of motion along the second axis 118. In these cases, where the touch input has components of motion along each of the first and second axes 116, 118, the touch input may be detected to correspond to the first gesture type where the first component of motion is larger, for example with a greater magnitude, than the second component of motion. In other examples, though, the touch input may not have a component of motion along both axes; for example, the touch input may be solely along the first axis 116 or solely along the second axis 118. In such examples, touch input solely along the first axis 116 may be detected to be the first gesture type. For example, the first gesture type may be a swipe or sliding movement of the touch input which is substantially along the first axis 116, for example with a greater magnitude along the first axis 116 than along the second axis 118.

In response to detecting that the touch input 108 corresponds with the first gesture type, a display characteristic of the image including the star 106 is adjusted during the displaying of the image, so that the properties of the image change in real time. In the example of FIGS. 2a and 2b, the display characteristic of the star 106 of FIG. 2a is adjusted based on detecting that the touch input 108 is of the first gesture type so as to display an adjusted star 106' in FIG. 2b. The adjusted star 106' is outlined with a solid line in FIG. 2b rather than a dashed line in FIG. 2a to indicate schematically that the display characteristic of the star has changed between FIGS. 2a and 2b.

The display characteristic of the image may be adjusted in dependence on at least one detected characteristic of the motion of the touch input. The at least one detected characteristic of the motion of the touch input may include at least one of a length of the touch input or a direction of the touch input. For example, the length of the touch input may be used to determine the magnitude or amount by which the display characteristic is to be altered and the direction of the touch input may be used to determine the direction in which the display characteristic is to be altered, e.g. whether the display characteristic is to be increased or decreased. In other examples, though, the at least one detected characteristic of the motion of the touch input may include other features or properties of the motion of the touch input such as the number of points of contact of the touch input with the touch-sensitive electronic display, e.g. corresponding to the number of fingers or implements touching the display, a degree of rotation of the touch input, an orientation of the touch input, a velocity or acceleration of the touch input, or a pressure applied to the touch-sensitive electronic display by the touch input.

Display characteristics that may be adjusted based on the touch input of the first gesture type may include any visible properties, features or attributes of the image. In examples, the display characteristic that may be adjusted based on a detected first gesture type includes at least one of a brightness of the image, a gamma correction strength of a gamma correction applied to the image, a saturation of the image, or a tone mapping strength of a tone mapping applied to the image.

A brightness of a pixel of an image is for example an arithmetic mean of the red, green and blue color coordinates or color channel intensity values in the red, green and blue (RGB) color space for that pixel. Alternatively, in the HSV (hue, saturation, value; sometimes referred to as hue, saturation, brightness, HSB) color space, the brightness of a pixel may be taken as the value, size or magnitude of the value or brightness coordinate. The brightness of the image may be considered generally as the relative lightness of the image and typically depends on the brightness of the pixels of the image. For example, the image brightness be an average or mean of the pixel brightnesses.

Adjusting the brightness for example can darken or brighten the image as whole, for example by decreasing or increasing the brightness of image pixels. For example, altering the brightness may involve shifting the brightness for each of the pixels of the image by the same amount. The direction of the shift, for example whether the image is darkened or brightened, may be controlled based on the direction of the touch input. In some examples, the image may be darkened by a downward movement of the touch input, for example from an upper to a lower location on the second are of the touch-sensitive electronic display, and lightened or brightened by an upward movement of the touch input. The amount by which the image is darkened or brightened may depend on the length of the movement of the touch input, with long movements, with a larger distance between the location at which the touch input first contacts the second area of the touch-sensitive electronic display and the location at which the movement ceases or halts, corresponding with a larger magnitude change in brightness. For example, the movement may be considered to cease or halt at the point or location on the touch-sensitive electronic display where the touch input ceases to contact the touch-sensitive electronic display, or when the touch input remains stationary at a particular point or location on the touch-sensitive electronic display for a time period longer than a predetermined time period.

Gamma correction is typically a non-linear operation that may be defined using the following power-law expression:

$$V_{out} = A V_{in}^{\gamma} \quad (1)$$

where Vout is an output value, A is a constant, Vin is an input value and γ is a gamma value. The input and output values are for example luminance or tristimulus values of pixels of the image.

The detected at least one characteristic of the touch input may be used to control or alter the γ-value in Equation 1. For example, a particular direction of motion, such as an upward motion, of the touch input may correspond with an increase in the γ-value and a different direction of motion of the touch input, such as a downward motion, may correspond with a decrease in the γ-value. The γ-value may be altered by an amount or magnitude corresponding to the length of the motion of the touch input.

Saturation is for example one of the coordinates in the HSL (hue, saturation, lightness) and HSV or HSB color spaces. The saturation may be understood intuitively as the relative bandwidth of a color of a pixel in wavelength space. For example, a highly saturated color may correspond to a color with a narrow bandwidth, which is highly peaked in wavelength space. In contrast, a color with a low saturation may have a large bandwidth, which may appear more "washed out".

The saturation may be adjusted in dependence on the at least one characteristic of the motion of the touch input similarly to adjustment of the brightness or gamma correction strength, with a direction of the motion indicating or determining whether the saturation is to be increased or decreased and a length of the motion determining the amount or magnitude by which the saturation is to be altered.

Tone mapping typically refers to a process by which a dynamic range of an image is adjusted to enhance the quality of an image, where the dynamic range is generally understood to refer to the ratio between intensities of the brightest and darkest parts of an image or scene. For example, tone mapping can be used to enhance detail or contrast in the image, while still ensuring the image appears relatively "natural" to an observer. To do this, the tone mapping may be asymmetric in the brightness domain, such that a greater amount of tone mapping is applied to dark regions of the image than relatively bright regions, for example by altering an intensity value of relatively dark portions of the image to a greater extent than relatively bright portions. This mimics the behavior of the human eye, which has a relatively high dynamic range, and which is capable of seeing detail in even relatively dark regions of an image. Tone mapping applied to the image may therefore be spatially-variant, for example spatially non-uniform, with a greater amount of tone mapping applied to certain spatial regions of the image compared with other spatial regions, although spatially-invariant or uniform tone mapping is also possible. The tone mapping may be continuous and smoothly-varying in both spatial and luminance dimensions. The intensity range of pixels corresponding with detail to preserve in the image in dark and/or light areas may therefore be increased and the intensity range of other areas of the image may be decreased. The amount of tone mapping may correspond with the extent or magnitude of alteration of the intensity value of pixels in the image by the tone mapping, for example to enhance the image detail as explained above.

The dynamic range may be compressed or expanded by the tone mapping. Dynamic range compression can be used to reduce the dynamic range of the image to match or be closer to a dynamic range displayable by the touch-sensitive electronic display, for example. Images captured using a camera can have a high dynamic range of for example up to around 4000:1. In contrast, the dynamic range of typical display devices may be much lower than this, for example around 50:1. Dynamic range compression can therefore be applied to reduce a dynamic range of image data representing a high dynamic range image to match a lower dynamic range of the touch-sensitive electronic display for displaying the image.

Conversely, dynamic range expansion can be used to increase a dynamic range of the image, for example in cases where the dynamic range displayable by the touch-sensitive electronic display is larger than a dynamic range of the image data representing the image to be displayed.

A suitable tone mapping algorithm is the Orthogonal Retina-Morphic Image Transform (ORMIT) algorithm, although various other, different, tone mapping algorithms are also suitable.

In examples, a tone mapping strength of a tone mapping to applied to the image may be adjusted in dependence on the at least one characteristic of the motion of the touch input. For example, the tone mapping strength may be increased or decreased depending on a direction of the motion and by an amount or magnitude depending on a length of the motion of the touch input, similarly to adjustment of the brightness, gamma correction strength and saturation as described above. The tone mapping strength may for example take a value between 0 and 1, which may represent an amount of spatially-variant tone mapping, such as an amount or magnitude by which each pixel's intensity or brightness is altered by the tone mapping. The tone mapping strength itself may be different for different pixels in the image, in order to achieve an amount of tone mapping which varies across the image. For example, the tone mapping strength may vary in accordance with pixel intensity so that the tone mapping is stronger (for example with a higher strength) in darker parts of the image with low pixel intensity values, and is weaker in brighter parts of the image. This allows stronger enhancement of the shadows without affecting the bright regions. In such cases, the tone mapping strength may not be uniformly changed or altered by the touch input. For example, the tone mapping strength may be adjusted using a formula, such that the tone mapping strength is adjusted more or less depending on pixel intensity values. In examples in which the tone mapping uses the ORMIT algorithm, the tone mapping strength is the ORMIT α parameter.

In examples, the first gesture type may adjust solely one of the display characteristics of the image, for example solely the tone mapping strength, solely the brightness, solely the gamma correction strength or solely the saturation of the image. In such examples, the method may additionally include receiving a further touch input to switch between display characteristic adjustment modes. For example, the user may be able to supply a particular touch input corresponding with a particular gesture of the plurality of detectable gesture types in order to switch between a mode in which the first gesture type adjusts the tone mapping strength to a different mode in which the first gesture type adjusts the brightness. The particular touch input may involve touching a particular region of the second area, such as a region corresponding with a given icon. For example, the user may be able to click on an icon corresponding with a "tone mapping adjustment" mode, or an icon corresponding with a "brightness adjustment" mode or other icons corresponding to other display characteristics in order to switch between these modes, to allow each of various display characteristics to be adjusted in turn.

In the example of FIGS. 2a and 2b, the display characteristic of the image is adjusted by a touch input on the image itself, which is in the first area 104 (corresponding to the second area). However, in other examples, the first gesture type may correspond with a touch input on a region of the second area outside the first area, for example a border area of the second area. In such cases, the touch input may be a touch input on a particular icon in the border area. For example, the border area may include respective images of a scale and a slider, which is moveable on screen relative to the scale. A position of the slider on the scale may be altered in dependence on the touch input to control the display characteristic of the image.

An output display characteristic based on the adjusting the display characteristic of the image may be stored and a subsequent image may be displayed with a subsequent image display characteristic based on the output display characteristic. In this way, the previously-obtained settings, which typically correspond with a user preference, may be saved and re-used to display future images. This can allow subsequent images to be displayed with the same or a corresponding display characteristic as the image, for example allowing a direct comparison between two different images with the same display characteristic. However, as the display characteristic of the subsequent image may also be adjusted using a touch input corresponding to the first gesture type, as described above for the image with respect to FIGS. 2a and 2b, this provides additional flexibility for the viewing of the subsequent image.

The output display characteristic may be stored in an image file including image data representing the image. For example, the output display characteristic may be stored as metadata associated with the image data. For example, where the image file is in the form of a JPEG, the output display characteristic may be stored in the Exchangeable Image File Format (EXIF). The EXIF data may be embedded within the image file itself, for example within the JPEG file. Typically, EXIF data is stored in a header of the JPEG. For example, EXIF data may be stored in one of the utility Application Segments of the JPEG, generally the APP1 (segment marker 0xFFE1), although other segments may be used.

By storing the output display characteristic in the image file including the image data representing the image, the method in examples allows further images to be generated based on the image data and the output display characteristic, from data contained within the image file itself. This allows the display characteristic, and hence the visual impression, of the image to be reproduced at different times, for example in different viewing conditions, or by different computing devices, based on the image file.

Figure 3A:
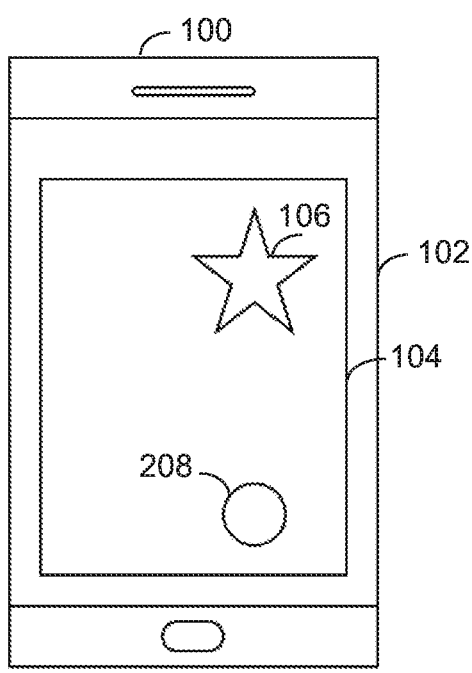
FIGS. 3a and 3b illustrate schematically an example of a second gesture type.
Figure 3B:
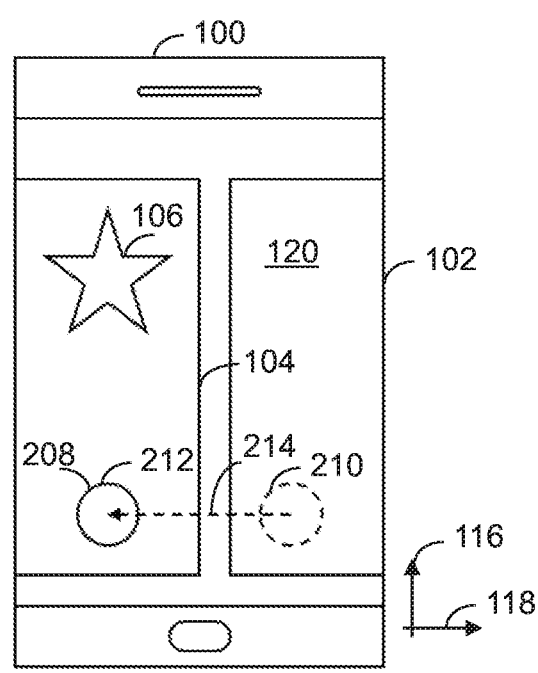

FIGS. 3a and 3b illustrate schematically an example of the second gesture type on the smartphone 100 shown in FIGS. 2a and 2b. Features of FIGS. 3a and 3b that are the same as corresponding features of FIGS. 2a and 2b are labelled with the same reference numerals; corresponding descriptions should be taken to apply. Features of FIGS. 3a and 3b that are similar to but not the same as corresponding features of FIGS. 2a and 2b are labelled with the same reference numerals but incremented by 100; corresponding descriptions should nevertheless be taken to apply.

FIG. 3a shows a touch input 208 on the second area of the touch-sensitive electronic display 102 (which corresponds with the first area 104 in this example). The touch input 208 is moved in FIG. 3b from a first location 210 on the second area to a second location on the second area along a path 214. In the example of FIG. 3b, the path 214 is substantially horizontal (for example within 5 or 10 degrees of the horizontal).

A gesture type is detected from the touch input 208, which in FIG. 3b is a second gesture type. In examples such as FIG. 3b, a touch input 208 is considered or detected to be a second gesture type if a larger component of motion of the touch input 208 is along the second axis 118 than along the first axis 116. In FIG. 3b, the path 214 is along the second axis 118. Therefore the motion of the touch input 208 is entirely or wholly along the second axis 118, and the component of motion of the touch input 208 along the first axis 116 is zero. In further examples, though, the touch input 208 may have a respective non-zero component along each of the first and second axes 116, 118, with a larger magnitude component along the second axis 118 than along the first axis 116.

Thus, in examples, the first gesture type differs from the second gesture type in that a touch input corresponding to the first gesture type has a larger component of motion along a different axis than the second gesture type. In this example, a touch input with a larger component of motion in a vertical direction (along the first axis 116) is associated with the first gesture type and a touch input with a larger component of motion in a horizontal direction (along the second axis 118) is associated with the second gesture type. Touch inputs corresponding respectively with the first gesture type and the second gesture type may be otherwise identical. Alternatively, these touch inputs may differ from each other in one or more other respects.

In response to detecting that the touch input 208 of FIG. 3b corresponds with the second gesture type, the touch-sensitive electronic display ceases to display the image and instead displays a further image, for example a different image than the originally displayed image. In this way, touch input 208 corresponding to the second gesture type may be used to switch between displaying various different images on the touch-sensitive electronic display.

In examples such as that of FIG. 3b, the ceasing to display the image on the touch-sensitive electronic display includes moving the image off the touch-sensitive electronic display along the other of the first and second axes of the touch-sensitive electronic display than the one of the first and second axes with a larger component of motion of a touch input of the first gesture type. This illustrated in FIG. 3b, which shows the image including the star 106 being moved off screen along the second axis 118, whereas the first gesture type has a larger component of motion of the touch input along the first axis 116. FIG. 3b shows a snapshot of a position of the image partway through the moving of the image. Subsequently, the image will continue moving leftwards, along the second axis 118, until the touch-sensitive electronic display no longer displays the image and solely displays the further image 120. In examples, the image may be moved off screen smoothly along the second axis 118, although in other examples the movement of the image off screen may be more sudden or jerky.

Figure 4A:
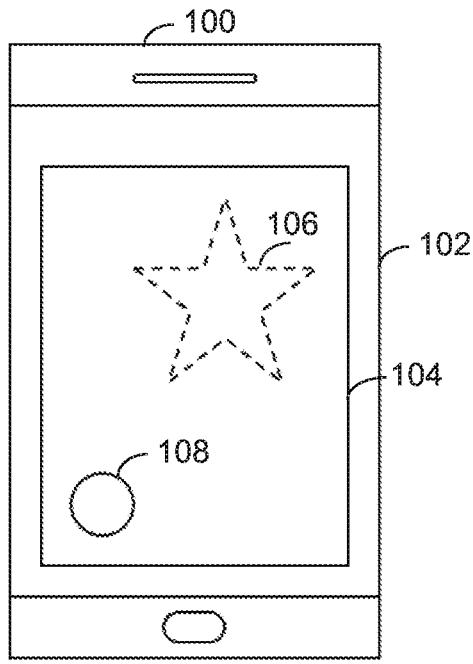
FIGS. 4a and 4b illustrate schematically an example of a third gesture type.
Figure 4B:
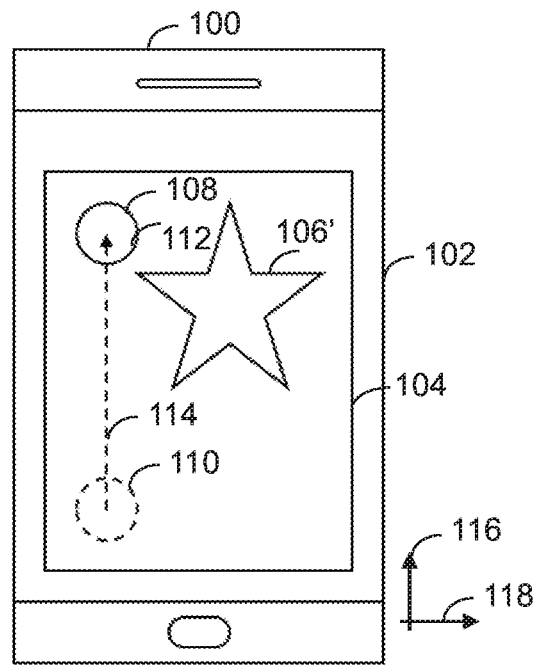

FIGS. 4a and 4b illustrate schematically an example of a third gesture type on the smartphone 100 shown in FIGS. 2a and 2b. Features of FIGS. 4a and 4b that are the same as corresponding features of FIGS. 2a and 2b are labelled with the same reference numerals; corresponding descriptions should be taken to apply.

In examples, such as that of FIGS. 4a and 4b, the smartphone 100 has at least a first display mode and a second display mode. The first display mode is, for example, a non-zoomed-in display mode, such as a mode illustrated in FIGS. 2 and 3, and the second display mode is, for example, a zoomed-in display mode, illustrated in FIGS. 4a and 4b. This can be seen by comparing the size of the star 106 in FIG. 2a with the star 106 of FIG. 4a; the star 106 is larger in FIG. 4a because the image is zoomed-in in FIG. 4a. A zoomed-in display mode is thus, for example, a display mode in which content to be displayed is scaled, for example increased in size.

In such examples, the first gesture type and the second gesture type may be detectable in the first display mode for the image and a third gesture type may be detectable in the second display mode for the image. If the detected gesture type is the third gesture type, the display characteristic of the image may be adjusted, during the displaying the image, in dependence on at least one detected characteristic of the motion of the touch input, for example similarly to the adjustment of the display characteristic upon detection of the first gesture type.

Features or properties of the touch input corresponding respectively to the first gesture type and the third gesture type may be the same, except that the first gesture type is detectable in the first display mode and the third gesture type is detectable in the second display mode. FIGS. 4a and 4b show such an example. As can be seen by comparing FIGS. 2b and 4b, the motion of the touch input 108 in these Figures is the same, and has the same effect of adjusting the display characteristic of the image.

However, in other examples in which the plurality of detectable gesture types include a fourth gesture type which is detectable during the zoomed-in display mode, a given touch input, if received during the non-zoomed-in display mode, is detected as the first gesture type and, if received during the zoomed-in display mode, is detected as the fourth gesture type. In these examples, detecting the third gesture type may include detecting an additional touch input compared to detecting the first gesture type.

Figure 5A:
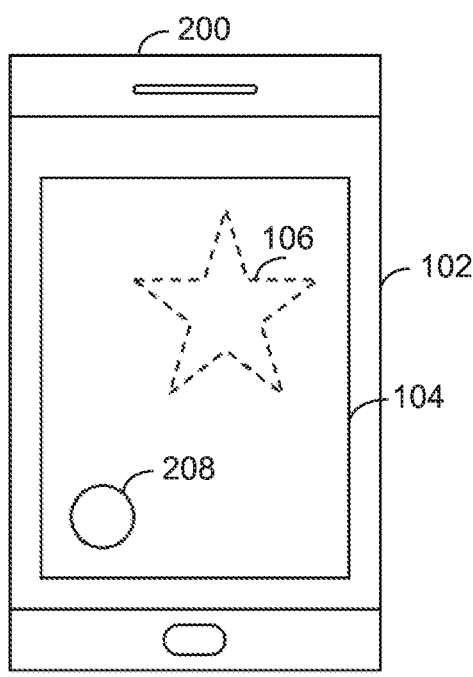
FIGS. 5a and 5b illustrate schematically an example of a fourth gesture type.
Figure 5B:
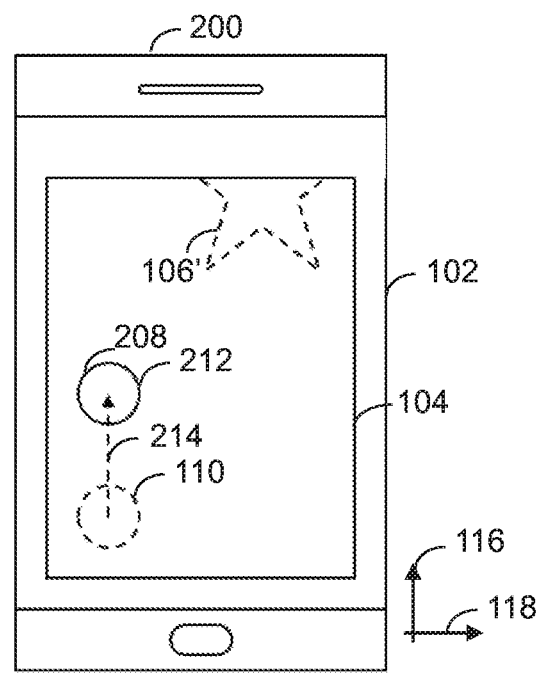

FIGS. 5a and 5b illustrate schematically an example of the fourth gesture type. Features of FIGS. 5a and 5b that are the same as corresponding features of FIGS. 2a and 2b are labelled with the same reference numerals; corresponding descriptions should be taken to apply. Features of FIGS. 5a and 5b that are similar to but not the same as corresponding features of FIGS. 2a and 2b are labelled with the same reference numerals but incremented by 100; corresponding descriptions should nevertheless be taken to apply.

The smartphone 200 of FIG. 5a is similar to the smartphone of FIGS. 2 to 4, however, in contrast to the smartphone 100 of FIGS. 2 to 4, a given touch input is detected as the first gesture type in the non-zoomed-in mode and the fourth gesture type in the zoomed-in mode, whereas the given touch input is detected as the first gesture type in the non-zoomed-in mode and the third gesture type in the zoomed-in mode in the smartphone 100 of FIGS. 2 to 4.

FIG. 5a shows an image in a zoomed-in mode, similarly to FIG. 4a. As can be seen in FIG. 5b, when the touch input 208 is moved from the first location 110 to a further location 212 along a path 214 in the same direction as the path 114 of FIG. 4b, the display characteristic of the image is not adjusted. Instead, the image is scrolled, for example moved upwards and partly off the touch-sensitive electronic display. Scrolling may for example refer to a sliding movement of the image across the touch-sensitive electronic display. The touch input 208 of FIG. 5b corresponds to the first gesture type as it has a larger component of motion along the first axis 116. However, as the touch input 208 is received during the zoomed-in display mode, it is detected as a fourth gesture type. In this example, the fourth gesture type corresponds with a command to scroll or alter a position of the image or other elements displayed on the touch-sensitive electronic display. In other examples, though, the fourth gesture type may correspond with other commands.

Figure 6A:
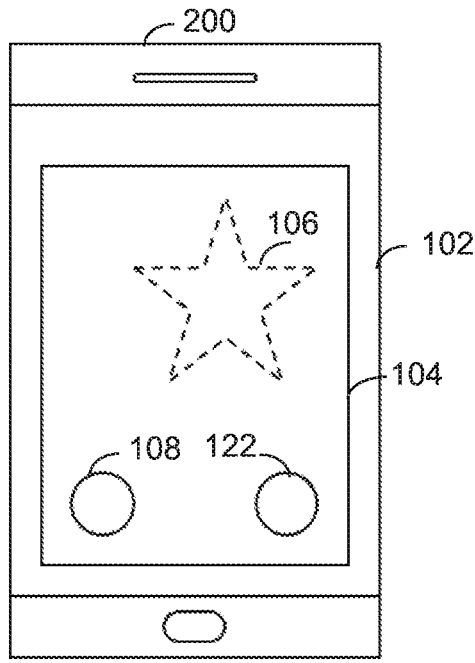
FIGS. 6a and 6b illustrate schematically a further example of the third gesture type.
Figure 6B:
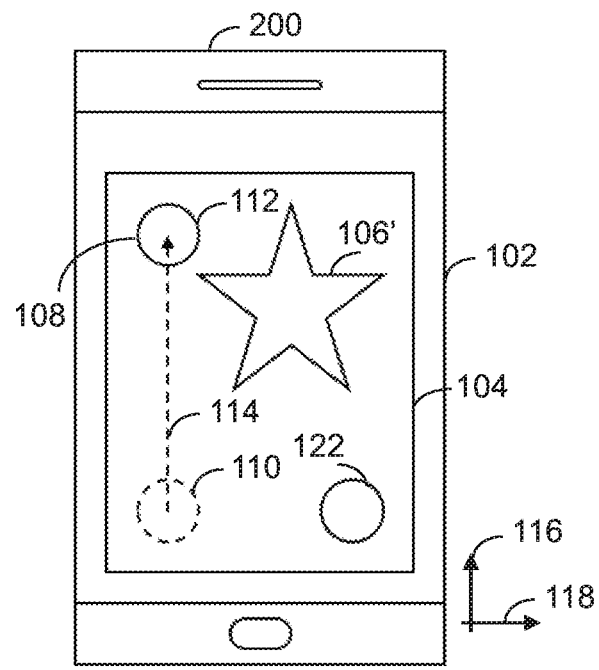

In order to alter the display characteristic of the image in the zoomed-in mode, an additional touch input must be applied in the example of FIGS. 5 and 6. This is illustrated in FIGS. 6a and 6b, which shows the smartphone 200 of FIGS. 5a and 5b. Features of FIGS. 6a and 6b that are the same as corresponding features of FIGS. 2a and 2b are labelled with the same reference numerals; corresponding descriptions should be taken to apply. Features of FIGS. 6a and 6b that are similar to but not the same as corresponding features of FIGS. 2a and 2b are labelled with the same reference numerals but incremented by 100; corresponding descriptions should nevertheless be taken to apply.

FIG. 6a shows the image being displayed in the zoomed-in mode. A touch input 108 is received on the second area. FIG. 6b illustrates the touch input 108 being moved from the first location 110 to the second location 112 along the path 114. The touch input 108 and the movement of the touch input 108 is the same as the touch input 108 of FIGS. 4a and 4b. However, in the example of FIGS. 6a and 6b, an additional touch input 122 is also received on the second area in addition to the touch input 108. The touch input 108 and the additional touch input 122 are detected as the third gesture type. The display characteristic of the image is adjusted, during the display the image, in dependence on at least one detected characteristic of the motion of the touch input, as described with reference to FIGS. 4a and 4b. In examples such as this, detecting a touch input as a third gesture type may include detecting a larger component of motion of the touch input 108 along the one of the first and second axes of the touch-sensitive electronic display, for example along the same axis along which the touch input has a larger component of motion for the first gesture type in the non-zoomed-in mode.

Thus, in examples such as that of FIGS. 6a and 6b, a multi-touch input is used to differentiate the third gesture type from the fourth gesture type, for example by associating the third gesture type with an input including a combination of a touch input and an additional touch input. This provides additional flexibility and options for image manipulation for the user. For example, a predetermined sub-area of the touch-sensitive electronic display may be allocated for receiving the additional touch input. In such cases, the detecting the additional touch input may include detecting the additional touch input on the predetermined sub-area. The predetermined sub-area may be part of the first area or part of the second area or outside one or both of the first and second areas. Suitable locations for the predetermined sub-area include a corner of the touch-sensitive electronic display such as a bottom corner. These locations may be used in cases in which the touch-sensitive electronic display is intended to be used in a landscape orientation or in other orientations of the touch-sensitive electronic display.

The size of the predetermined sub-area may be selected based on characteristics of an intended user of the touch-sensitive electronic display. For example, the predetermined sub-area may correspond with or approximately equal the size of an average human thumb, for example with an area which is within plus or minus 10%, plus or minus 20%, plus or minus 30%, plus or minus 40%, or plus or minus 50% of the surface area of an average portion of a human thumb that would come into contact with the touch-sensitive electronic display when a human touches the display.

An additional touch input corresponding with the third gesture type in an example of a multi-touch input may therefore involve holding or touching a predetermined sub-area of the touch-sensitive electronic display located in the bottom left corner of the touch-sensitive electronic display with the thumb on the same hand as used for holding the touch-sensitive electronic display (which is typically the left hand, for example where the touch-sensitive electronic display is part of a smartphone). The right hand can then be used to apply the touch input, for example to adjust the display characteristic of the image or to switch between images displayed on the touch-sensitive electronic display. Either one or more fingers or the thumb of the right hand can be used for applying the touch input.

In a further example of a multi-touch input, an additional touch input corresponding with the third gesture type may be input by the left thumb as explained above. However, the touch-sensitive electronic display may be held by the right hand and the thumb of the right hand may be used for applying the touch input.

In yet further examples in which there is a multi-touch input, the actions of the left and right hands in the examples above may be reversed.

Figure 7:
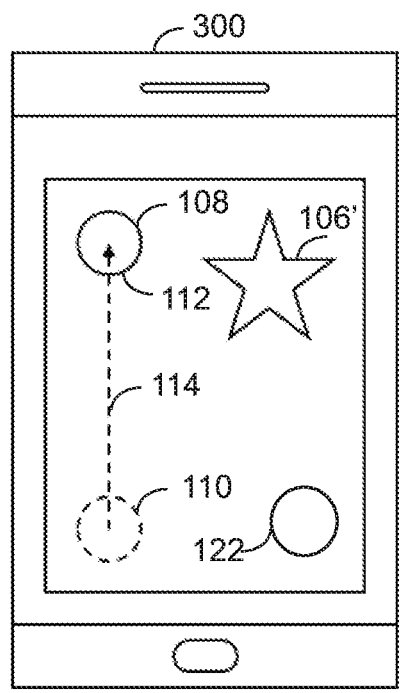
FIG. 7 illustrates schematically a further example of the first gesture type.

A multi-touch input may also be used in other modes, such as a non-zoomed-in mode. FIG. 7 shows such an example. Features of FIG. 7 the same as those of FIGS. 2a and 2b are labelled with the same reference numerals; corresponding descriptions should be taken to apply. The smartphone 300 of FIG. 7 is similar to the smartphone 100 of FIGS. 2a and 2b except that it is configured to detect a different first gesture type than the smartphone 100 of FIGS. 2a and 2b. In such examples, detecting the first gesture type may include detecting a plurality of touch inputs comprising the touch input. For example, FIG. 7 shows the touch input 108 and an additional touch input 122; the touch input 108 and the additional touch input 122 are the same as the respective touch input 108 and the additional touch input 122 described with reference to FIGS. 6a and 6b, except that they are in the zoomed-out mode in FIG. 7. The touch input 108 is moved along the path 114 to adjust the display characteristic of the image, similarly to the example of FIGS. 6a and 6b.

An overview of examples of internal components for the computing device, such as the smartphones 100, 200, 300 of FIGS. 2 to 7, is provided below with reference to FIG. 8.

Figure 8:
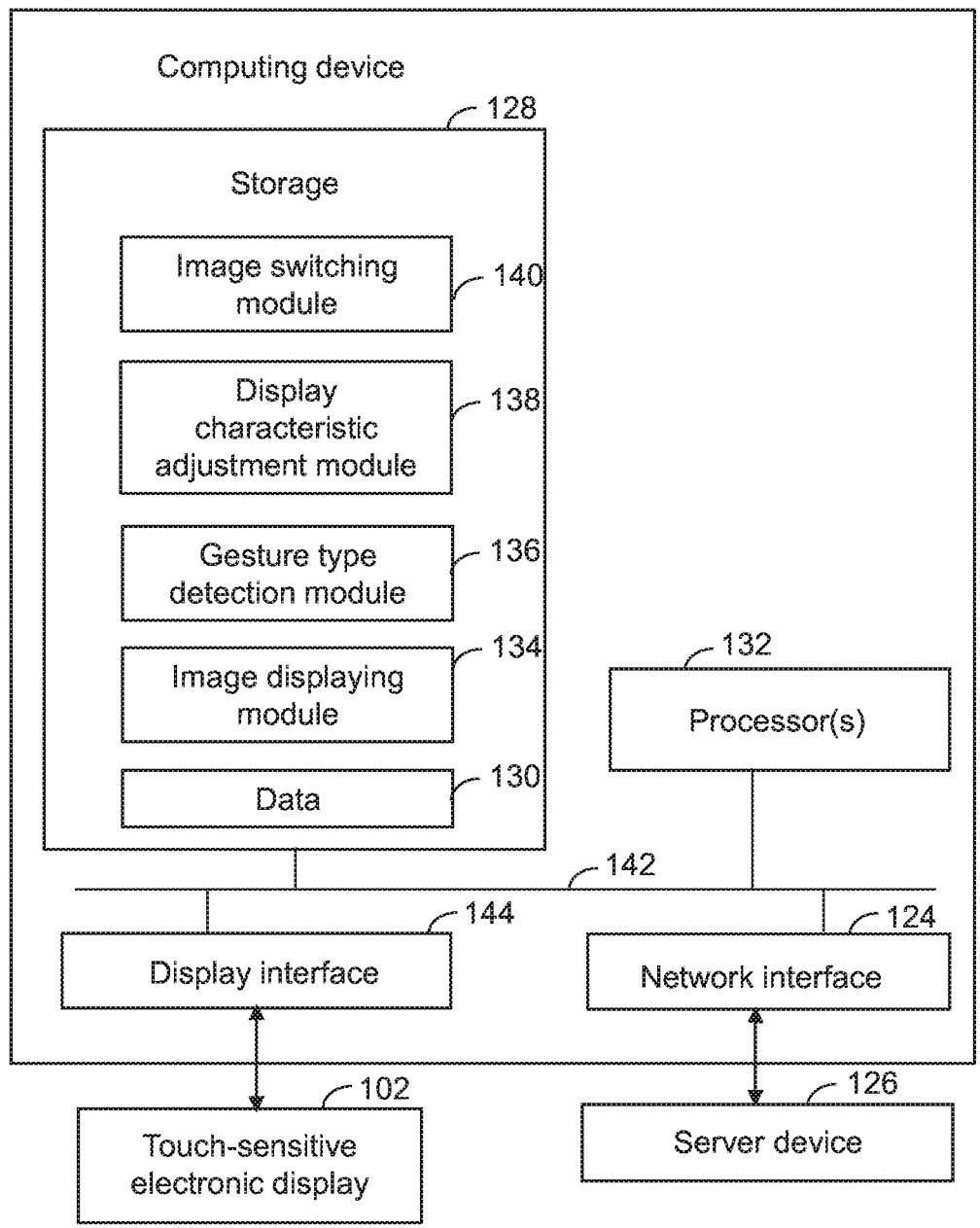
FIG. 8 is a schematic diagram showing an example of internal components of a computing system.

The computing device of FIG. 8 includes a network interface 124. The network interface 124 allows image files to be retrieved from a server device 126. The network interface 124 of the computing device may include software and/or hardware components, such as a virtual network interface, an Ethernet port, a software driver and/or communications stack interacting with network hardware.

Storage 128 of the computing device in the example of FIG. 8 stores data 130 received at the network interface 124. The data 130 in this example includes an image file including image data representing an image for display. The storage 128 may include at least one of volatile memory, such as a Random Access Memory (RAM) and non-volatile memory, such as Read Only Memory (ROM) or a solid state drive (SSD) such as Flash memory. The storage 128 in examples may include further storage devices, for example magnetic, optical or tape media, compact disc (CD), digital versatile disc (DVD) or other data storage media. The storage 128 may be removable or non-removable from the computing device.

At least one processor 132 is communicatively coupled to the storage 128 in the computing device of FIG. 8. The at least one processor 132 in the example of FIG. 8 may be a microprocessor, a general-purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The at least one processor 132 may also be or include at least one graphics processing unit (GPU) such as an NVIDIA® GeForce® GTX 980, available from NVIDIA®, 2701 San Tomas Expressway, Santa Clara, Calif. 95050, USA, although other processors are possible. For example, in one case the computing device may include a thin terminal with graphics processing capabilities; in other cases the computing device may include a computing device comprising at least one central processing unit (CPU) and at least one graphics processing unit.

The storage 128 in the example of FIG. 8 includes an image displaying module 134 configured to display the image on the first area of the touch-sensitive electronic display 102, and a gesture type detection module 136 configured to detect, from a touch input on the second area of the touch-sensitive electronic display, a gesture type which is one of a plurality of detectable gesture types. As described above, the plurality of detectable gesture types include a first gesture type and a second gesture type, detecting the first gesture type including detecting a larger component of motion of the touch input along one of the first and second axes of the touch-sensitive electronic display than along the other of the first and second axes of the touch-sensitive electronic display and detecting the second gesture type including detecting a larger component of motion of the touch input along the other of the first and second axes of the touch-sensitive electronic display than along the one of the first and second axes of the touch-sensitive electronic display.

The storage 128 in this example further includes a display characteristic adjustment module 138 configured to, if the detected gesture type is the first gesture type, adjust, during displaying the image on the first area of the electronic display, a display characteristic of the image in dependence on at least one detected characteristic of the motion of the touch input. The storage 128 also includes an image switching module 140 configured to, if the detected gesture type is the second gesture type, cease displaying the image on the touch-sensitive electronic display 102 and display a further image on the touch-sensitive electronic display 102.

One or more of the image displaying module 134, the gesture type detection module 136, the display characteristic adjustment module 138, or the image switching module 140 may be implemented as hardware. Alternatively, one or more of these modules may be implemented as software, or as a combination of hardware and software. Where at least one of these modules is at least partly implemented as software, the storage 128 may include computer program instructions configured to, when processed by the at least one processor 132, implement the respective module. The computer program instructions may be stored in an accessible non-transitory computer-readable medium and loaded into memory, for example the storage 128, to implement the respective module. In examples, the storage 128 and the computer program instructions are configured to, with a graphics processing unit of the storage 128, implement at least one of the modules. For example, use of the graphics processing unit may allow for parallel processing of multiple operations for adjustment of the display characteristic of the image, improving the speed at which the display characteristic is altered.

The components of the computing device in the example of FIG. 8 are interconnected using a systems bus 142. This allows data to be transferred between the various components. For example, an image file including data representing the image may be stored in the storage 128 and subsequently transmitted via the systems bus 142 from the storage 128 to a display interface 144 for transfer to the touch-sensitive electronic display 102 for display. The display interface 144 may include a display port and/or an internal electronics interface, e.g. where the touch-sensitive electronic display 102 is part of the computing device such as a display screen of a smartphone. Therefore, when instructed by the at least one processor 132 via the display interface 144, the touch-sensitive electronic display 102 will display an image based on the image data.

The touch-sensitive electronic display 102 is for example a conventional touchscreen. For example, the touch-sensitive electronic display 102 may be or include a resistive touchscreen panel or a capacitive touchscreen panel configured to detect one or more touches of an input or proximity of the input that occur at various locations on the panel to produce signals representative of a location of the input for each of the touches.

The above examples are to be understood as illustrative examples. Further examples are envisaged. In the examples of FIGS. 2 to 7, touch input with a larger component in the vertical direction is considered to correspond to the first gesture type. However, in other examples, touch input with a larger component in the vertical direction may correspond with the second gesture type and the first gesture type may correspond with a touch input with a larger component in the horizontal direction. In yet further directions, the first and second axes may not be horizontal and vertical. For example, the first and second axes may be rotated with respect to vertical and horizontal axes.

In the example of FIG. 8, an image file including image data representing an image is received from a server device. However, in other examples, the image file may be stored on storage of the computing device. For example, the image may have been captured by an image capture device such as a camera of or coupled to the computing device or may have been downloaded or transferred to the computing device from other storage than storage of a server device, and stored as the image file on storage of the computing device.

Examples described above refer to adjusting the tone mapping strength by adjusting the ORMIT α parameter, which is obtained based on the at least one characteristic of the motion of the touch input. However, in other examples, the tone mapping strength may be derived by further processing of a motion characteristic value obtained based on the at least one characteristic of the motion of the touch input. The motion characteristic value is for example a value between 0 and 1, which depends on a length and/or direction of motion of the touch input. For example, a tone mapping strength applied to the image may be derived by combining the motion characteristic value with a further tone mapping strength parameter to generate a combined tone mapping strength. For example, whereas the motion characteristic value depends on the touch input, which e.g. corresponds with a user preference, the further tone mapping strength parameter may be depend on a different parameter or property. For example, the further tone mapping strength parameter may depend on a predetermined value; a display property of a display device configured to display an output image based on the output image data; an ambient light level; or an application property of an application for use in displaying the output image based on the output image data.

The pre-determined value may be, for example, a value that a content creator or image supplier has determined is an optimal or desired tone mapping to obtain a desired output image for viewing. For example, the creator or supplier of the image may have ascertained that the image quality of the image is optimal in particular viewing conditions with a particular reference tone mapping strength parameter used as an input to the tone mapping. This may be determined for example by adjusting the tone mapping strength to adjust the strength of the tone mapping applied to the image, analyzing the display quality of the output image after the application of the tone mapping, for example by eye or electronically, and storing a reference tone mapping strength corresponding with the optimal display quality as part of the input image file as further tone mapping strength data representing the further tone mapping strength parameter. The viewing conditions the further tone mapping strength parameter is optimized for may be relatively dark viewing conditions. In such cases, the further tone mapping strength parameter may be zero, for example such that the tone mapping does not alter the input image data, so that the output image and the input image are the same. In other cases, the reference tone mapping strength parameter may be non-zero. The further tone mapping strength parameter may depend on the content of the image. For example, where the image includes human skin, the further tone mapping strength parameter may be non-zero as human skin has a limited brightness, and therefore may be enhanced by tone mapping, for example to amplify detail in the skin.

The display property of the display device, such as one of the touch-sensitive electronic displays 100, 200, 300 described above, may be any property, characteristic or attribute that may affect the display quality of the image. For example, the display property may be a luminance of the display device, e.g. a maximum brightness or intensity of light emitted from a backlight for illuminating pixels of the display device or a maximum pixel luminance, or a display device type. Typically, a different amount of tone mapping is required for different types of display device, for example liquid crystal display devices (LCDs) compared with organic light emitting diode display devices (OLEDs), to achieve a given display quality of an image, for example with a given amount of detail visible in dark regions of the image.

Where the further tone mapping strength parameter depends on the ambient light level, the ambient light level can be measured for example by an ambient light sensor. The ambient light sensor may be coupled to or integral with the computing device. Such an ambient light sensor may include one or more photodetectors; the use of multiple photodetectors may increase the reliability of the measurement of diffuse ambient light.

As explained above, in some cases the further tone mapping strength parameter may depend on an application property of an application for use in displaying the image. An application property is for example a property specified by the developer, manufacturer or designer of the application that is intended for use in displaying the image, for example a browser or other application capable of displaying images. The application property may for example specify that images should be displayed with a particular tone mapping, for example where it is desired to give images displayed using the application a particular "look". For example, the application developers may wish to display hyper-realistic images, with a high dynamic range, or murky images, with little detail visible, with a low dynamic range.

The motion characteristic value and the further tone mapping strength parameter may be combined in various ways, as the skilled person will appreciate. For example, the motion characteristic value may be or correspond with a particular, e.g. a pre-determined, gain G. The gain G may be expressed as:

$$G = \frac{D_{TM}}{D} \quad (2)$$

where D is the dynamic range of the image data before tone mapping and D_TM is a pre-determined output dynamic range to be obtained after the tone mapping.

The input value α to the tone mapping may be derived from the gain G as follows:

$$\alpha = \frac{G-1}{G_{max}-1} \quad (3)$$

where G is the gain defined in (2), and Gmax is the maximum gain achievable with a maximum tone mapping strength.
where G is the gain defined in (2), and $G_{max}$ is the maximum gain achievable with a maximum tone mapping strength.

Where the motion characteristic value and the further tone mapping strength parameter are combined, both the motion characteristic value and the further tone mapping strength parameter may correspond with different respective gain values. In such cases, the gain associated with the motion characteristic value, denoted as a first gain $G_1$, and the gain associated with the further tone mapping strength parameter, denoted as a second gain $G_2$, may be multiplied together as follows to obtain a combined gain denoted as $G_C$:

$$G_C = G_1 * G_2 \quad (4)$$

Similarly, the further tone mapping strength parameter may be combined with more than one set of further tone mapping strength parameters by multiplying the first gain $G_2$ with the respective gain corresponding with each of set of further tone mapping strength parameters.

The combined strength parameter $\alpha_C$ may then be calculated as:

$$\alpha_C = \frac{G_C - 1}{G_{max} - 1} \quad (5)$$

As the skilled person will appreciate, other methods or algorithms may be used to combine the motion characteristic value and the further tone mapping strength parameter. For example where the motion characteristic value equals a tone mapping strength parameter $\alpha_1$ and the further tone mapping strength parameter equals a different tone mapping strength parameter $\alpha_2$, the combined strength parameter αC may be obtained by multiplying $\alpha_1$ and $\alpha_2$.

The motion characteristic value and the further tone mapping strength parameter may be combined using software, hardware or a combination of software and hardware.

In other examples, a method sometimes referred to as alpha-blending may be used to tone map the image. As the skilled person will appreciate, alpha-blending typically involves overlaying or combining of two versions of the same image: a first version of the image with no tone mapping applied (or a lower or different amount of tone mapping than the second version of the image) and one with non-zero tone mapping applied, which may be with maximal tone mapping applied, for example. A relative contribution of the first and second version of the image to the image as displayed on the touch-sensitive electronic display may depend on the at least one detected characteristic of the motion of the touch input (e.g. the motion characteristic value referred to above).

In such examples, the tone mapping strength may be a combined tone mapping strength parameter (e.g. obtained from a combination of the motion characteristic value and the further tone mapping strength parameter as described above), or the motion characteristic value itself. Where the tone mapping strength is the combined tone mapping strength parameter, ac, the pixel intensity values of pixels of the image may be modified as:

$$I_{out} = I_1 * (1 - \alpha_C) + I_2 * \alpha_C \quad (6)$$

where $I_{out}$ is the output intensity value for the output image data representing the image as displayed on the touch-sensitive electronic display, $I_1$ is the pixel intensity value from the first version of the image and $I_2$ is the pixel intensity value from the second version of the image.

Other blending schemes are also possible. For example, the pixel intensity values may instead be modified as:

$$I_{out} = \sqrt{I_1^2 * (1 - \alpha_C) + I_2^2 * \alpha_C} \quad (7)$$

where $I_{out}$, $I_1$, $I_2$ and $\alpha_C$ are as previously defined.

In examples in which the touch input is detected to correspond to the first gesture type, this may be taken to be an indication that the tone mapping strength (or another display characteristic) is to vary. In such examples, first image data representing a first version of the image with a first amount of tone mapping, which may be spatially-variant, may be stored in a first frame buffer, and second image data representing a second version of the image with a second amount of tone mapping, which may also be spatially-variant, may be stored in a second frame buffer. The first amount of spatially-variant tone mapping is, for example, zero and the second amount of spatially-variant tone mapping is, for example, non-zero, and may be a maximal amount of tone mapping.

By storing the first image data in a first frame buffer and the second image data in a second frame buffer, various different amounts of alpha-blending can readily be applied to the first image data and the second image data. This can allow for rapid changing of the tone mapping applied to the image, for example based on the touch input.

For example, a display characteristic adjustment module of the computing device may receive, for each of at least one additional frame for display by the touch-sensitive electronic display, a respective additional input value determined in dependence on at least one characteristic of the motion of the touch input. For example, each additional input value may correspond with a change in the motion of the touch input within a predetermined time period, e.g. corresponding to one frame, compared with a previous time period. In this way, the user may vary the tone mapping applied in each of the at least one additional frame based on the touch input.

The display characteristic adjustment module may further be arranged to generate, for each of the at least one additional frame, an additional frame buffer storing additional output image data representing an additional output image based on the first image data and the second image data, a relative contribution of the first image data and the second image data to the additional image data depending on the additional input value for the respective frame.

In such examples, the image may therefore be displayed in a first frame and, in each of the at least one additional frame, the respective additional output image may be displayed. In such cases, the at least one additional frame are, for example, subsequent to the first frame.

This method for example allows each of the at least additional frame to be associated with a different amount of alpha-blending of the first version of the image and the second version of the image, allowing the tone mapping of the image to be rapidly varied, as the image is displayed. For example, there is no need to re-retrieve the image data nor to recalculate or redo the tone mapping for each frame. Instead, it is merely necessary to recalculate the pixel intensities for the image to be displayed based on the motion characteristic value and/or the further tone mapping strength parameter, for example by changing the relative contribution of the first version of the image and the second version of the image to the additional output image. This can be performed rapidly, for example by a graphics processing unit of the computing device.

In yet further examples, the tone mapping controlled in dependence on the at least one characteristic of the motion of the touch input may be a further tone mapping applied to an image that has already been tone mapped.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

Further examples are described in accordance with the following numbered clauses:

Clause 1. A method comprising: displaying an image on a first area of a touch-sensitive electronic display, the touch-sensitive electronic display comprising a first axis and a second axis which is orthogonal to the first axis; receiving touch input on a second area of the touch-sensitive electronic display, the second area comprising the first area; and detecting, from the touch input, a gesture type which is one of a plurality of detectable gesture types, wherein the plurality of detectable gesture types comprise a first gesture type and a second gesture type, wherein detecting the first gesture type comprises detecting a larger component of motion of the touch input along one of the first and second axes of the touch-sensitive electronic display than along the other of the first and second axes of the touch-sensitive electronic display and detecting the second gesture type comprises detecting a larger component of motion of the touch input along the other of the first and second axes of the touch-sensitive electronic display than along the one of the first and second axes of the touch-sensitive electronic display, and wherein: if the detected gesture type is the first gesture type, the method comprises: adjusting, during the displaying the image, a display characteristic of the image in dependence on at least one detected characteristic of the motion of the touch input; and if the detected gesture type is the second gesture type, the method comprises: ceasing to display the image on the touch-sensitive electronic display; and displaying a further image on the touch-sensitive electronic display.

Clause 2. The method according to clause 1, wherein the plurality of detectable gesture types comprise a third gesture type, wherein the first gesture type and the second gesture type are detectable in a first display mode for the image and wherein the third gesture type is detectable in a second display mode for the image, and wherein: if the detected gesture type is the third gesture type, the method comprises adjusting, during the displaying the image, the display characteristic of the image in dependence on at least one detected characteristic of the motion of the touch input.

Clause 3. The method according to clause 2, wherein the first mode is a non-zoomed-in display mode and the second mode is a zoomed-in display mode.

Clause 4. The method according to clause 3, wherein the plurality of detectable gesture types comprise a fourth gesture type which is detectable during the zoomed-in display mode, and wherein: a given touch input, if received during the non-zoomed-in display mode, is detected as the first gesture type and, if received during the zoomed-in display mode, is detected as the fourth gesture type; and detecting the third gesture type comprises detecting an additional touch input compared to detecting the first gesture type.

Clause 5. The method according to any one of clauses 2 to 4, wherein detecting the third gesture type comprises detecting a larger component of motion of the touch input along the one of the first and second axes of the touch-sensitive electronic display than along the other of the first and second axes of the touch-sensitive electronic display.

Clause 6. The method according to any one of clauses 1 to 4, wherein detecting the first gesture type comprises detecting a plurality of touch inputs comprising the touch input.

Clause 7. The method according to any one of clauses 1 to 6, wherein ceasing to display the image on the touch-sensitive electronic display comprises moving the image off the touch-sensitive electronic display along the other of the first and second axes of the touch-sensitive electronic display.

Clause 8. The method according to any one of clauses 1 to 7, wherein the second area is coincident with the first area.

Clause 9. The method according to any one of clauses 1 to 8, comprising: storing an output display characteristic based on the adjusting the display characteristic of the image; and displaying a subsequent image with a subsequent image display characteristic based on the output display characteristic.

Clause 10. The method according to any one of clauses 1 to 9, comprising:
storing an output display characteristic based on the adjusting the display characteristic of the image in an image file comprising image data representing the image.

Clause 11. The method according to any one of clauses 1 to 10, wherein the at least one detected characteristic of the motion of the touch input comprises at least one of: a length of the touch input; or a direction of the touch input.

Clause 12. The method according to any one of clauses 1 to 11, wherein the display characteristic comprises at least one of: a tone mapping strength of a tone mapping applied to the image; a brightness of the image; a gamma correction strength of a gamma correction applied to the image; or a saturation of the image.

Clause 13. The method according to any one of clauses 1 to 12, wherein the first axis is a substantially vertical axis and the second axis is a substantially horizontal axis, detecting the first gesture type comprising detecting the larger component of the motion of the touch input along the first axis and detecting the second gesture type comprising detecting the larger component of the motion of the touch input along the second axis.

Clause 14. The method according to any one of clauses 1 to 13, wherein the image is in an 8-bit JPEG (Joint Photographic Experts Group) format or a more than 8-bit JPEG XT format.

Clause 15. A computing system comprising: a computing device; and a touch-sensitive electronic display coupled to the computing device, the touch-sensitive electronic display comprising a first axis, a second axis which is orthogonal to the first axis, a first area and a second area, the second area comprising the first area, wherein the computing device comprises: storage; at least one processor communicatively coupled to the storage; an image displaying module configured to: display the image on the first area of the touch-sensitive electronic display; a gesture type detection module configured to: detect, from a touch input on the second area of the touch-sensitive electronic display, a gesture type which is one of a plurality of detectable gesture types, the plurality of detectable gesture types comprising a first gesture type and a second gesture type, detecting the first gesture type comprising detecting a larger component of motion of the touch input along one of the first and second axes of the touch-sensitive electronic display than along the other of the first and second axes of the touch-sensitive electronic display and detecting the second gesture type comprising detecting a larger component of motion of the touch input along the other of the first and second axes of the touch-sensitive electronic display than along the one of the first and second axes of the touch-sensitive electronic display; a display characteristic adjustment module configured to, if the detected gesture type is the first gesture type: adjust, during displaying the image on the first area of the electronic display, a display characteristic of the image in dependence on at least one detected characteristic of the motion of the touch input; and an image switching module configured to, if the detected gesture type is the second gesture type: cease displaying the image on the touch-sensitive electronic display; and display a further image on the touch-sensitive electronic display.

What is claimed is:

1. A method comprising:
    displaying an image on a first area of a touch-sensitive electronic display, the touch-sensitive electronic display comprising a first axis and a second axis which is orthogonal to the first axis;
    receiving touch input on a second area of the touch-sensitive electronic display, the second area comprising the first area;
    detecting, from the touch input, a gesture type which is one of a plurality of detectable gesture types, wherein the plurality of detectable gesture types comprise a first gesture type and a second gesture type, wherein detecting the first gesture type comprises detecting a larger component of motion of the touch input along one of the first and second axes of the touch-sensitive electronic display than along the other of the first and second axes of the touch-sensitive electronic display and detecting the second gesture type comprises detecting a larger component of motion of the touch input along the other of the first and second axes of the touch-sensitive electronic display than along the one of the first and second axes of the touch-sensitive electronic display, wherein:
        if the gesture type is detected to be the first gesture type, the method comprises:
            adjusting, during the displaying the image, a display characteristic of the image in dependence on at least one detected characteristic of the motion of the touch input, wherein the display characteristic comprises a tone mapping strength of a tone mapping applied to the image, wherein applying the tone mapping to the image comprises applying alpha-blending to the image, the alpha-blending comprising combining a first version of the image with a second version of the image, wherein:
                the first version of the image represents the image with a first amount of tone mapping applied; and
                the second version of the image represents the image with a second amount of tone mapping applied,
            wherein a relative contribution of the first version of the image and the second version of the image to the image as displayed on the first area of the touch-sensitive electronic display depends on the at least one detected characteristic of the motion of the touch input;
            storing, in storage, an output display characteristic based on the adjusting the display characteristic of the image; and
            after displaying the image:
                obtaining subsequent image data representing a subsequent image;
                retrieving the output display characteristic from the storage; and
                displaying the subsequent image with a subsequent image display characteristic based on the output display characteristic; and
        if the gesture type is detected to be the second gesture type, the method comprises:
            ceasing to display the image on the touch-sensitive electronic display; and
            displaying a further image on the touch-sensitive electronic display.

2. The method according to claim 1, wherein the plurality of detectable gesture types comprises a third gesture type, wherein the first gesture type and the second gesture type are detectable in a first display mode for the image and wherein the third gesture type is detectable in a second display mode for the image, and wherein:
    if the gesture type is detected to be the third gesture type, the method comprises adjusting, during the displaying the image, the display characteristic of the image in dependence on at least one detected characteristic of the motion of the touch input.

3. The method according to claim 2, wherein the first mode is a non-zoomed-in display mode and the second mode is a zoomed-in display mode.

4. The method according to claim 3, wherein the plurality of detectable gesture types comprises a fourth gesture type which is detectable during the zoomed-in display mode, and wherein:
    a given touch input, if received during the non-zoomed-in display mode, is detected as the first gesture type and, if received during the zoomed-in display mode, is detected as the fourth gesture type; and
    detecting the third gesture type comprises detecting an additional touch input compared to detecting the first gesture type.

5. The method according to claim 2, wherein detecting the third gesture type comprises detecting a larger component of motion of the touch input along the one of the first and second axes of the touch-sensitive electronic display than along the other of the first and second axes of the touch-sensitive electronic display.

6. The method according to claim 1, wherein detecting the first gesture type comprises detecting a plurality of touch inputs comprising the touch input.

7. The method according to claim 1, wherein ceasing to display the image on the touch-sensitive electronic display comprises moving the image off the touch-sensitive electronic display along the other of the first and second axes of the touch-sensitive electronic display.

8. The method according to claim 1, wherein the second area is coincident with the first area.

9. The method according to claim 1, comprising storing an output display characteristic based on the adjusting the display characteristic of the image in an image file comprising image data representing the image.

10. The method according to claim 1, wherein the at least one detected characteristic of the motion of the touch input comprises at least one of:
a length of the touch input; or
a direction of the touch input.

11. The method according to claim 1, wherein the display characteristic comprises at least one of:
a brightness of the image;
a gamma correction strength of a gamma correction applied to the image; or
a saturation of the image.

12. The method according to claim 1, wherein the image is in an 8-bit JPEG (Joint Photographic Experts Group) format or a more than 8-bit JPEG XT format.

13. The method according to claim 1, wherein the tone mapping strength applied to the image is a combined tone mapping strength parameter generated by combining a motion characteristic value with a further tone mapping strength parameter, wherein:
the motion characteristic value depends on the at least one detected characteristic of the motion of the touch input; and
the further tone mapping strength parameter depends on a different property to the at least one detected characteristic of the motion of the touch input.

14. The method according to claim 13, wherein the further tone mapping strength parameter depends on at least one of:
a predetermined value;
a display property of the touch-sensitive electronic display;
an ambient light level; or
an application property of an application for use in displaying the image.

15. The method according to claim 1, comprising:
storing first image data representing the first version of the image in a first frame buffer; and
storing second image data representing the second version of the image in a second frame buffer.

16. The method according to claim 15, comprising:
receiving, for each of at least one additional frame for display by the touch-sensitive electronic display, a respective additional input value, wherein the additional input value corresponds with a change in the motion of the touch input within a predetermined time period; and
generating, for each of the at least one additional frame, an additional frame buffer storing additional output image data representing an additional output image based on the first input image data and the second input image data, a relative contribution of the first image data and the second image data to the additional output image data depending on the additional input value for the respective frame.

17. A computing system comprising:
a computing device; and
a touch-sensitive electronic display coupled to the computing device, the touch-sensitive electronic display comprising a first axis, a second axis which is orthogonal to the first axis, a first area and a second area, the second area comprising the first area,
wherein the computing device comprises:
storage;
at least one processor communicatively coupled to the storage;
an image displaying module configured to display the image on the first area of the touch-sensitive electronic display;
a gesture type detection module configured to detect, from a touch input on the second area of the touch-sensitive electronic display, a gesture type which is one of a plurality of detectable gesture types, the plurality of detectable gesture types comprising a first gesture type and a second gesture type, wherein:
detecting the first gesture type comprising detecting a larger component of motion of the touch input along one of the first and second axes of the touch-sensitive electronic display than along the other of the first and second axes of the touch-sensitive electronic display, and
detecting the second gesture type comprising detecting a larger component of motion of the touch input along the other of the first and second axes of the touch-sensitive electronic display than along the one of the first and second axes of the touch-sensitive electronic display;
a display characteristic adjustment module configured to:
if the gesture type is detected to be the first gesture type, adjust, during displaying the image, a display characteristic of the image in dependence on at least one detected characteristic of the motion of the touch input, wherein the display characteristic comprises a tone mapping strength of a tone mapping applied to the image, wherein applying the tone mapping to the image comprises applying alpha-blending to the image, the alpha-blending comprising combining a first version of the image with a second version of the image, wherein:
the first version of the image represents the image with a first amount of tone mapping applied; and
the second version of the image represents the image with a second amount of tone mapping applied,
wherein a relative contribution of the first version of the image and the second version of the image to the image as displayed on the first area of the touch-sensitive electronic display depends on the at least one detected characteristic of the motion of the touch input; and
store, in the storage, an output display characteristic based on the adjusting the display characteristic of the image; and
an image switching module configured to, if the gesture type is detected to be the second gesture type:
cease displaying the image on the touch-sensitive electronic display; and display a further image on the touch-sensitive electronic display,
wherein the image displaying module is further configured to, if the display characteristic of the image is adjusted during displaying the image, and after displaying the image:
obtain subsequent image data representing a subsequent image;
retrieve the output display characteristic from the storage; and
display the subsequent image with a subsequent image display characteristic based on the output display characteristic.

18. The computing system according to claim 17, wherein the plurality of detectable gesture types comprises a third gesture type, wherein the first gesture type and the second gesture type are detectable in a first display mode for the image, using the gesture type detection module, and wherein the third gesture type is detectable in a second display mode for the image, using the gesture type detection module, and wherein:
if the gesture type is detected to be the third gesture type, the display characteristic adjustment module is configured to adjust, during the displaying the image, the display characteristic of the image in dependence on at least one detected characteristic of the motion of the touch input.

19. The computing system according to claim 18, wherein the first mode is a non-zoomed-in display mode and the second mode is a zoomed-in display mode.

20. The computing system according to claim 19, wherein the plurality of detectable gesture types comprises a fourth gesture type which is detectable during the zoomed-in display mode, and wherein the gesture type detection module is configured to:
detect a given touch input, if received during the non-zoomed-in display mode, as the first gesture type and, if received during the zoomed-in display mode, as the fourth gesture type,
wherein detecting the third gesture type comprises detecting an additional touch input compared to detecting the first gesture type.

* * * * *